UNITED STATES PATENT OFFICE.

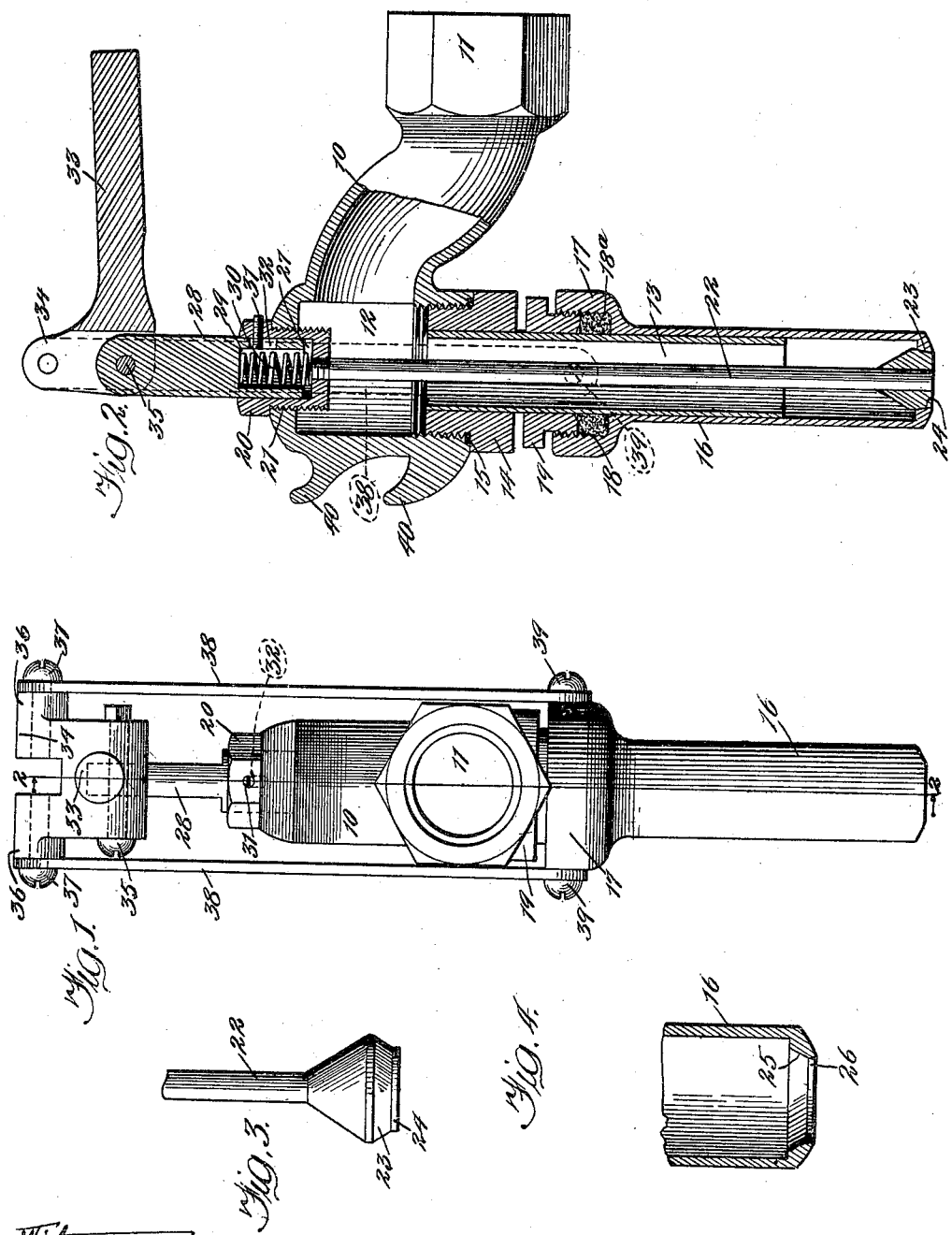

ALLEN A. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

FAUCET.

964,487.

Specification of Letters Patent. Patented July 19, 1910.

Application filed April 15, 1907. Serial No. 368,136.

*To all whom it may concern:*

Be it known that I, ALLEN A. BOWSER, a citizen of the United States, residing at Fort Wayne, in the county of Allen and State of Indiana, have invented certain new and useful Improvements in Faucets, of which the following is a specification.

This invention relates to improvements in faucets and the primary object of the same is to construct an improved device of this character, provided with an extensible nozzle or discharge spout, which latter is adapted to be projected into the receptacle as the valve is opened.

A further object is to construct an improved device of this character which is provided with the extensible nozzle and improved means for projecting the nozzle into the receptacle.

A further object is to provide an improved device of this character which will be simple and cheap in construction and efficient and effective in operation.

To the attainment of these ends and the accomplishment of other new and useful objects, as will appear, the invention consists in the features of novelty in the construction, combination and arrangement of the several parts hereinafter more fully described and claimed and shown in the accompanying drawing illustrating an exemplification of the invention and in which;

Figure 1 is an end elevation of the construction shown in Fig. 2. Fig. 2 is a longitudinal sectional view on line 2—2 of Fig. 1 of an improved faucet, constructed in accordance with the principles of this invention. Fig. 3 is a detailed elevation of one of the valve members. Fig. 4 is a detailed sectional view of a portion of the extensible member and the other valve member.

Referring more particularly to the drawings and in this exemplification of the invention, the figure 10 designates the casing of the faucet which is provided with an inlet 11 and a discharge outlet 12, Secured to the discharge outlet and in any suitable manner is a tubular nozzle 13, to one end of which is preferably secured a threaded nut or bushing 14 and the threads on said nut or bushing 14 are adapted to engage corresponding threads in the discharge outlet 12 of the valve casing. If desired, suitable packing material 15 may be provided in order to form a fluid-tight joint.

Telescoping with the nozzle 13 is a tubular member 16, one end of which is preferably enlarged as at 17 and provided with a threaded recess 18. Surrounding the nozzle 13 is a nut or bushing 19, which is provided with peripheral screw threads and said nut is adapted to be seated in the recess 18 so that the threads thereon will engage the threads in the recess 18, and in the recess suitable packing 18ª may be placed, if desired.

Removably seated in the casing, at a point above and preferably in line with the tubular nozzle 13 is a member or bushing 20 which is provided with peripheral threads adapted to engage suitable threads in an aperture 21 in the casing 10. A rod or support 22 is removably secured by one end of the bushing or member 20 in such a manner that the rod or support will project through the discharge opening 12 of the casing 10 of the nozzle 13 and project for some distance beyond the extremity of said nozzle, and secured to the free end of this rod or support 22 is a valve member 23 preferably in the shape of a conical plug having a depending portion 24.

The outer extremity of the tubular member 16 is provided with a conical valve seat 25 beyond which is a cylindrical portion or aperture 26.

The bushing or member 20 is preferably provided with a recess 27 and extending into said recess is one end of a fulcrum 28, which latter preferably projects above the top of the casing 10. The extremity of the fulcrum 28, which is located within the bushing or member 27 is preferably provided with a recess 29, and seated within said recess is a yielding member 30, such as a spring or the like, and said member is of such a size that one end thereof will engage and rest against the bottom of the recess 27 in the bushing or member 20 and the other end will engage and rest against the bottom of recess 29 in the fulcrum 28 and said member 30 serves as a yielding support for the fulcrum 28.

Any suitable means may be provided for preventing the displacement of the fulcrum 28, but a simple and effective means for accomplishing this purpose comprises a screw or bolt 31 which projects through the side of the bushing or member 20, with one extremity thereof entering a slot or elongated aperture 32 in the fulcrum 28, which is preferably located adjacent to the recessed end thereof and said screw or bolt 31 also serves as a means for limiting the yielding movement of the fulcrum 28.

Pivotally supported by the fulcrum 28 is an operating handle 33 and said handle is preferably provided with the extension 34 which projects beyond the point of pivotal support 35 thereof.

The extension 34 of the operating handle 33 is preferably provided with lateral projecting ears or lugs 36 which extend beyond the sides of the casing 10 and pivotally connected by one end to these ears or lugs 36, such as by means of screws or bolts 37 or the like, are links 38, the free extremities of which are pivotally connected to the enlarged portion 17 of the tubular member 16 in any desired or suitable manner such as by means of screws or bolts 39 or the like, and said links 38 are of such a length than when the operating handle 33 is in the position shown more clearly in Fig. 2 of the drawings, the valve members 23—25 will be brought into engagement with each other to close the nozzle and the extension 24 on the valve member 23 will be seated within and fill the cylindrical portion 26 beyond the valve member 25.

Assuming the members to be in the position shown in Figs. 1 and 2 of the drawings, the operation of this valve is as follows: If desired, a suitable receptacle, such as a bucket or the like may be suspended or hung by its bail upon either one of the projections 40 on the valve casing. The handle 33 may then be moved about its pivotal support 35 to cause the links 38 to move the tubular member 16 upon the nozzle 13 to project said member 16 into the receptacle. This movement of the tubular member 16 will move the valve member 25 away from the valve member 23 and open the nozzle to permit the fluid to be discharged into the receptacle, and by projecting the nozzle into the receptacle, the danger of the fluid being splashed over the side of the receptacle is avoided.

When the desired quantity has been discharged, the handle 33 may be moved about its point of pivotal support 35 in the opposite direction, which will cause the links 38 to draw the tubular member 16 back upon the nozzle 13 and the valve member 25 into engagement with the valve member 23 and when the handle has reached the position shown in Fig. 2, the valve members will be seated and the nozzle closed, the yielding member 30 exerting its tension upon the fulcrum 28 will cause the valve members to be held in contact with each other. The projecting portion 24 of the valve member 23 entering the cylindrical portion 26 of the valve member 25 will force the fluid from the valve member 25 and will completely fill the portion 26, so as to wipe all fluid therefrom to prevent dripping after the valve is closed.

The yielding member 30 exerting its tension upon the fulcrum 28 when the valve is closed will also serve as a means to lock the handle 33 in its inoperative position and prevent the valve from becoming accidentally unseated, and the handle 33 is preferably arranged so as to extend away from the discharge opening 12 and stand above the casing 10 of the faucet so as to obviate the danger of the handle being accidentally struck.

In order that the invention might be fully understood by those skilled in the art, the details of the foregoing embodiment thereof have been thus specifically described, but

What I claim as new and desire to secure by Letters Patent is:—

1. In combination in a faucet, a nozzle comprising a fixed and a movable section, means for closing the free end of the outermost section for closing the nozzle and means for extending the movable section beyond the fixed section and for opening of the nozzle.

2. In combination in a faucet, a nozzle comprising telescoping members, means separate from the members for closing the free end of one of the members, and means for moving one of the members to open said member and extend the nozzle.

3. In combination in a faucet, a nozzle comprising telescoped members, a valve for closing the free end of the outermost member, and means for moving one of the members to unseat the valve and extend the nozzle.

4. In combination in a faucet an extensible nozzle comprising telescoping members, a valve, a valve seat at or near the free end of the outermost member and adapted to coöperate with the valve for closing the nozzle, and means for unseating the valve and adjusting said members for extending the nozzle.

5. In combination in a faucet an adjustable nozzle comprising telescoping members, a stationary valve member operatively related to one of the free ends of the outermost of the telescoping members and coöperating with the first said valve member to close the nozzle, and means for moving one of the first said members to adjust the nozzle and unseat the valve.

6. In combination in a faucet an adjustable nozzle comprising telescoping members, a stationary valve member, a coöperating valve member adjacent the free end of the outermost one of the first said members adapted to engage the first valve member to close the nozzle, means for moving one of the members to separate the valve members and to adjust the nozzle, and means for normally holding the valve members in engagement.

7. In combination in a faucet an adjustable nozzle comprising telescoping members, a stationary valve member, a coöperating valve member adjacent the end of one of the first said members adapted to engage the first valve member to close the nozzle, positive means for moving one of the members to separate the valve member and to adjust the nozzle, and yielding means separate from the last said means for normally holding the valve members in engagement.

8. In combination in a faucet an adjustable nozzle comprising two members one of which is movable with relation to the other, a valve member, a second valve member substantially at the free end of the movable member and adapted to engage the first said valve member to close the nozzle, and means for projecting the movable one of the first said members beyond the other member to extend the nozzle and open the valve.

9. In combination in a faucet an adjustable nozzle comprising two members, one of which is movable with relation to the other, a valve member supported by the free end of the movable member, a stationary valve member adapted to coöperate with the first said valve member to close the nozzle and means for moving the movable one of the first said members to adjust the nozzle and simultaneously unseat the valve.

10. In combination in a faucet, an extensible nozzle comprising telescoping members, a stationary valve member, a movable valve member supported by one of the first said members and adapted to engage the first said valve member to close the nozzle, yielding means for holding the valve members in engagement, and means for moving one of the first said members to extend the nozzle and adjust the movable valve member against the tension of the yielding means.

11. In combination in a faucet, an extensible nozzle comprising telescoping members, a stationary valve member, one of the first said members being provided with a valve member adapted to coöperate with the stationary valve member to close the nozzle, an operating handle, a yielding support for the handle, and an operating connection between the handle and one of the telescoping members for adjusting said members to extend the nozzle and unseat the valve when the handle is moved.

12. In combination in a faucet, an extensible nozzle comprising telescopic members, coöperating valve members adapted to close the nozzle, a yieldingly supported member, an operating handle pivotally supported by the last said member, and an operative connection between the handle and one of the telescoping members for adjusting said member when the handle is moved and for simultaneously controlling the movable valve member.

13. In combination in a faucet, an extensible nozzle comprising telescoping members, one of said members being provided with a valve seat, a stationary valve coöperating with the seat and adapted to close the nozzle, a yieldingly supported operating handle and links pivotally connected to the handle and to one of the first said members whereby the first said member will be adjusted to extend the nozzle and simultaneously unseat the valve when the handle is moved in one direction, said yielding support tending to normally seat the valve.

14. In combination in a faucet a nozzle comprising telescoping members, a stationary valve member, a valve member supported by one of the first said members, said valve members being adapted to coöperate to close the nozzle, a yielding support, a handle pivoted to the support, an operative connection between the handle and one of the first said members whereby said member will be adjusted with relation to its telescoping member when the handle is operated and simultaneously control the valve, and means for preventing displacement of the support.

15. In a faucet the combination of a nozzle, an adjustable tubular member telescoping with the nozzle, a valve member located adjacent the end of the nozzle, a support for said member, said tubular member being provided with a seat adapted to be moved against the valve to close the nozzle, an operating handle a connection between the handle and the tubular member for moving the valve seat away from the valve to open the nozzle and for adjusting the said tubular member on the nozzle to extend the latter when the handle is operated, and means tending to normally hold the valve and valve seat in engagement.

16. In a faucet the combination of a casing provided with a discharge nozzle including an adjustable tubular member telescoping with the nozzle, a support secured to the casing and projecting through the nozzle, a valve member on the support adjacent the end of the nozzle, said tubular member being provided with a valve seat adapted to be brought into engagement with the valve to close the nozzle, a handle pivotally supported on the casing, and an operative connection between the handle and the tubular member for moving the valve seat away from the valve to open the nozzle and for simultaneously adjusting the tubular member on the nozzle to extend the nozzle beyond the valve.

17. In a faucet the combination of a casing provided with a discharge nozzle including an adjustable tubular member telescoping with the nozzle, a support secured to the casing and projecting through the nozzle, a valve member on the support adjacent the end of the nozzle, said tubular member being provided with a valve seat adapted to be brought into engagement with the valve to close the nozzle, a yielding fulcrum supported by the casing, a handle pivoted to the fulcrum, and an operative connection between the handle and the tubular member for separating the valve members to open the nozzle and for simultaneously extending the tubular member beyond the end of the nozzle, said yielding fulcrum tending to normally hold the valve members in engagement.

18. In combination in a faucet a casing provided with a discharge nozzle, a member removably seated in the casing above the outlet, a support secured to the member, said support projecting through and beyond the nozzle, a valve on the support adjacent the end of the nozzle, said nozzle including a tubular member telescoping therewith, one end of said member surrounding the valve and the support and provided with a valve seat adapted to be brought into engagement with the valve to close the nozzle, a fulcrum movably supported by the first said member and projecting beyond the casing, an operating handle pivoted to the fulcrum and an operative connection between the handle and the tubular member for moving the latter upon the nozzle to extend said nozzle and simultaneously unseat the valve when the handle is moved.

19. In combination in a faucet a casing provided with a discharge nozzle, a member removably seated in the casing above the outlet, a support secured to the member, said support projecting through and beyond the nozzle, a valve on the support adjacent the end of the nozzle, said nozzle including a tubular member telescoping therewith, one end of said member surrounding the valve and the support and provided with a valve seat adapted to be brought into engagement with the valve to close the nozzle, a fulcrum movable and supported by the first said member and projecting beyond the casing, a yielding member disposed between the fulcrum and the casing, an operating handle pivoted to the fulcrum and an operative connection between the handle and the tubular member for moving the latter upon the nozzle and against the tension of the yielding member, to extend said nozzle and simultaneously unseat the valve when the handle is moved.

20. In combination in a faucet, a casing provided with a discharge nozzle, a member removably seated in the casing above the outlet, a support secured to said member, said support projecting through the nozzle and beyond the end thereof, said nozzle including a tubular member telescoping therewith, one end of said member being provided with a valve seat adapted to engage the valve to close the nozzle, a fulcrum, means for securing the fulcrum to the casing for bodily movement with relation thereto, said fulcrum being provided with a recess in its end, a spring disposed within the recess and engaging the first said member for yieldingly supporting the fulcrum, an operating handle pivoted to the fulcrum and an operative connection between the handle and tubular member for moving the latter when the handle is operated to extend the nozzle and unseat the valve.

In testimony whereof I have signed my name to this specification, in the presence of two subscribing witnesses, on this 5th day of April A. D. 1907.

ALLEN A. BOWSER.

Witnesses:
S. B. BECHTEL,
C. A. DUNKELBERG.